Jan. 8, 1952 — M. B. SWISHER ET AL — 2,582,177
POWERED CASTER WHEEL FOR VEHICLES
Filed June 4, 1948 — 2 SHEETS—SHEET 1

Inventor
MAX B. SWISHER +
GUY L. BOOTHE
By Fishburn & Mullendore
Attorneys

Jan. 8, 1952     M. B. SWISHER ET AL     2,582,177
POWERED CASTER WHEEL FOR VEHICLES
Filed June 4, 1948     2 SHEETS—SHEET 2
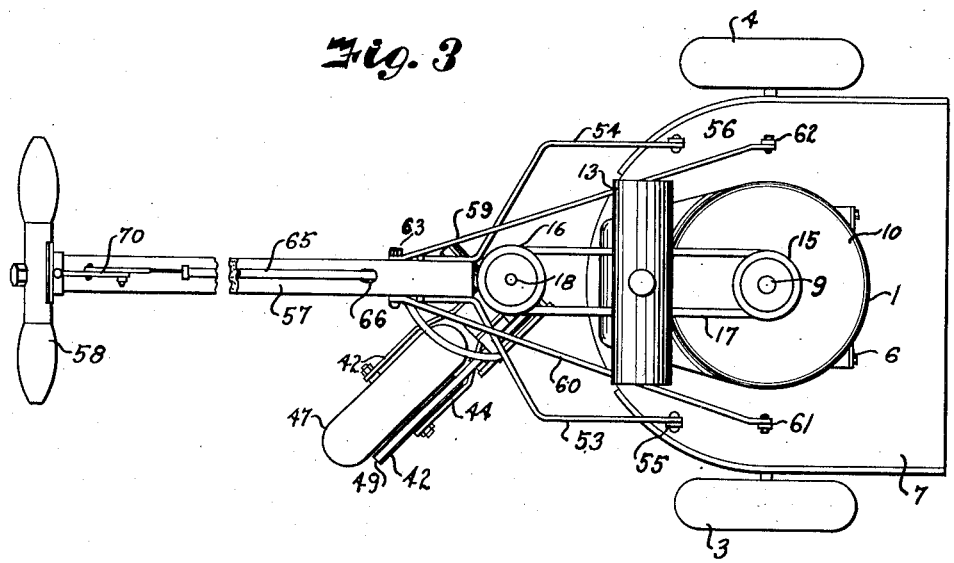
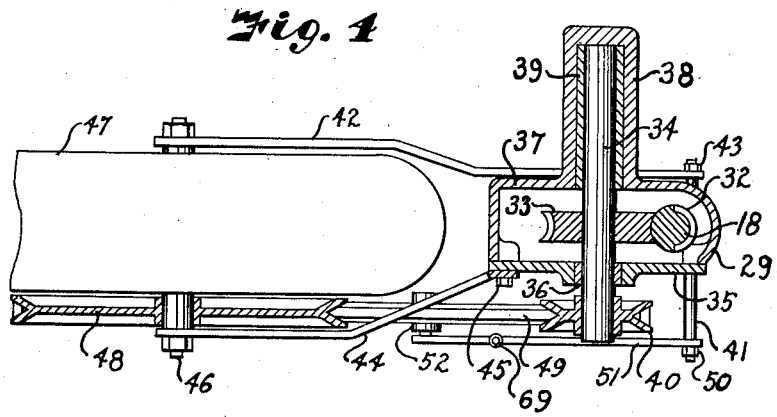
Inventor
MAX. B. SWISHER &
GUY L. BOOTHE
By Fishburne & Mullendore
Attorneys Patented Jan. 8, 1952

2,582,177

UNITED STATES PATENT OFFICE 2,582,177

POWERED CASTER WHEEL FOR VEHICLES

Max B. Swisher, Leeton, and Guy L. Boothe, Kansas City, Mo.

Application June 4, 1948, Serial No. 31,078

3 Claims. (Cl. 180—19)

1

This invention relates to new and useful improvements in power driven lawn mowers and other vehicles and more particularly to a device of this character having a single combined powered caster wheel for steering and propelling the vehicle.

The principal objects of the present invention are to provide a device of this character having a caster wheel for driving the machine; to provide a power-driven caster wheel which is adapted to be mounted at the rearward end of a vehicle frame; to provide for rotation of the caster wheel for guiding the machine; to provide a caster wheel turning on an axis fixed in the socket of a rotating spindle forwardly of the bearing point of the wheel; to provide a pulley and belt for driving the caster wheel from a shaft turned by a belt and pulley from the motor of the device; to provide for idling of the driving belt to the caster wheel; and to provide a caster wheel of this character simple, efficient and economical to manufacture and efficient in operation.

In accomplishing these and other objects of the present invention, we have provided improved details of structure, the preferred forms of which are illustrated in the accompanying drawing, wherein:

Fig. 3 is a top plan view of the device showing the caster wheel in steering position.

Fig. 4 is a cross sectional view taken on the line 4—4, Fig. 1.

Figure 1:
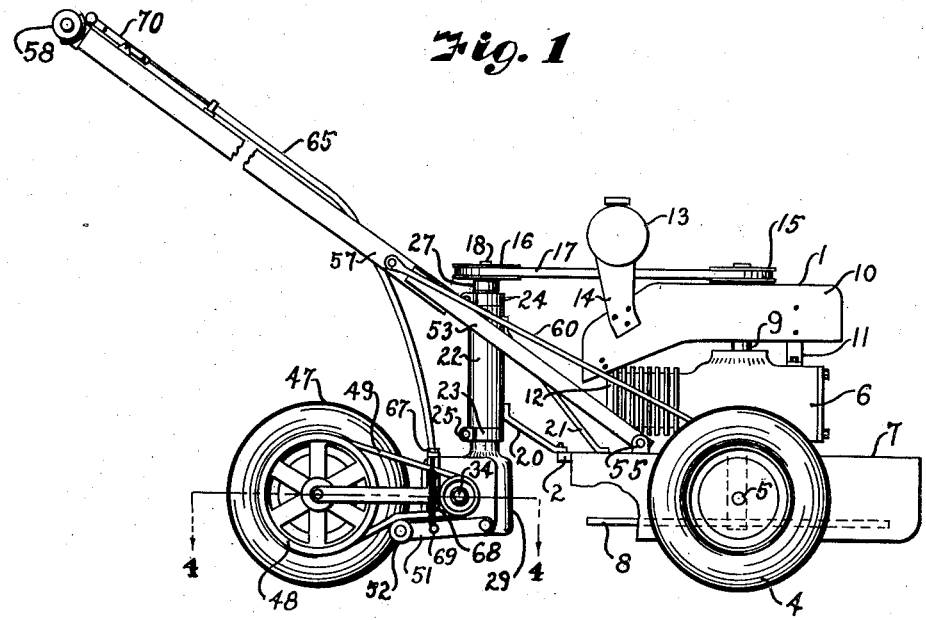
Fig. 1 is a side elevation of a powered vehicle embodying the features of our invention.

Referring more in detail to the drawing:

1 designates a powered implement embodying the features of our invention, particularly illustrating a mower for cutting grass and the like comprising a frame 2 having wheels 3 and 4 on an axis 5 for supporting the structure. A motor 6 is mounted on the frame above the housing structure 7 for a cutting blade 8 mounted on the lower end of a vertical shaft 9 driven by the motor 6. A housing 10 is provided for the motor supported on brackets 11 and 12 mounted on the motor 6. The housing 10 supports a fuel tank 13 mounted on arms 14 extending upwardly from the housing.

The foregoing structure is conventional in implements of this character.

The shaft 9 extends above the housing 10 and mounted thereon is a pulley 15 having connection

2 with a pulley 16 by belt 17 carried by the upper end of a shaft 18 mounted in a vertical bearing housing 19 supported rearwardly of the frame 2 by brackets 20 and 21 attached to a sleeve 22 provided for encircling the housing 19 and is held in place on the housing by clamps 23 and 24 at the upper and lower ends respectively by bolts or the like 25 extending through ears 26 of the clamps. The brace arms 20 and 21 are secured to the sleeve 22 by welding or other suitable means. A collar 27 is provided at the upper end of the housing 19 and is secured to the vertical shaft 18 by set screw 28, the pulley 16 being mounted on the shaft above the collar by any suitable means.

Figure 2:
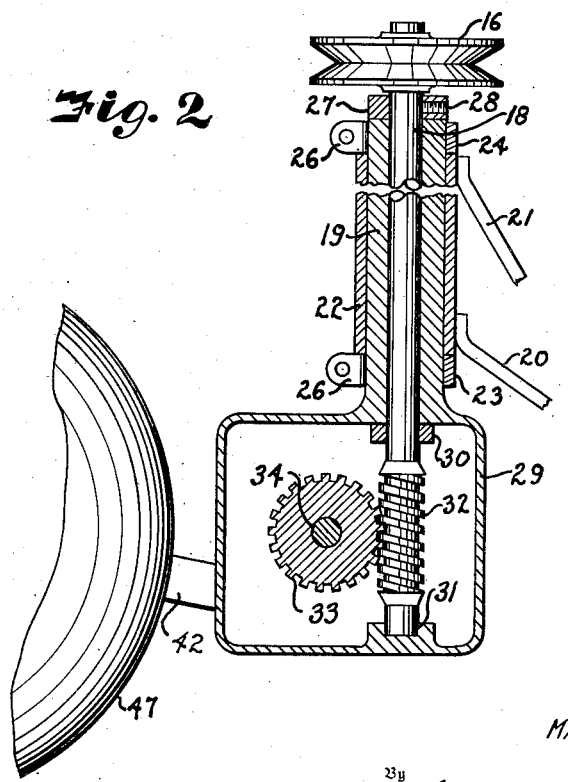
Fig. 2 is a vertical sectional view through the housing for the shaft for driving the caster wheel showing the shaft and its connection.

The vertical shaft 18 extends through the vertical bearing housing 19 and into a box or housing 29 formed integral with the housing 19. A collar 30 is provided in the housing 29 surrounding the shaft 18 at the lower end of the vertical housing lending support for the shaft. The lower end of the shaft is mounted in a bearing 31 formed in the lower end of the housing 29 as best illustrated in Fig. 2. The lower end of the vertical shaft 18 is provided with a worm gear 32 adapted to engage a gear 33 mounted on a shaft 34 mounted horizontally of the vertical shaft 18. The shaft 34 extends through the side 37 of the housing 29 and is provided with horizontally extending housing 38 into which the shaft 34 extends and is provided with a bearing sleeve 39 to provide proper support for the shaft.

A rod 41 is mounted in the lower forward portion of the housing 29 as best illustrated in Fig. 4. A bracket arm 42 is secured to the rod by a nut 43 and extends rearwardly of the housing. A bracket arm 44 extends rearwardly of the housing, and has its forward end secured to the side 35 of the housing 29 by a stud bolt or like as indicated at 45 (Fig. 4). Mounted between the rear ends of said brackets on an axle 46 is a caster wheel 47 and mounted on the axle 46 at one side of the caster wheel is a pulley 48 having driving connections through belt 49 with the pulley 40 mounted on the horizontal shaft 34. The rod 41 extends outwardly from the side 35 of the housing 29 and secured thereto by a stud bolt 50 is an arm 51 carrying on its rear end an idler roller or pulley 52.

Bracket arms 53 and 54 having their forward ends secured to studs 55 and 56 on the top of the rear portion of the housing 7 supports a handle 57 having the usual cross member 58 for guiding the implement. Braces 59 and 60 are secured to the handle 57 and they also extend forwardly and attach to the top part of the housing 7 as indicated at 61 and 62 (Fig. 3), the rear ends of the brace members being attached to the sides of the handle by bolt or the like 63.

Secured to the upper side of the handle 57 in a suitable manner is a flexible rod or wire 65 extending through an opening in the handle as indicated at 66 and has its lower end attached to a connecting member 67 provided with a coil spring 68 attached to the lever arm 51 as indicated at 69 for engaging and disengaging the idler roller with the belt 59 for driving the implement when desired. A suitable latching device as indicated at 70 (Fig. 1) is provided for holding the rod 65 in a driving position when the device is in driving operation.

Operation of a device constructed and assembled as described is as follows:

Operation of the engine 6 will cause the pulley and belt connection with the vertical shaft 18 to rotate said shaft and the worm gear 32 meshing with the gear on the horizontal shaft in the housing 29 will rotate the pulley 40 on the end of the horizontal shaft. When it is desired to propel the implement, manipulation of the flexible rod 65 on the handle 57 will cause the idler pulley 52 to contact the belt 49 to rotate the caster wheel 47 through belt connection with the pulley 48 on the side of said wheel. When it is desired to stop the implement release of the flexible lever 65 will disengage the idler roller from the belt to throw the device out of gear.

Steering of the implement is accomplished by guiding of the handle 57, the caster wheel being rigidly mounted on the housing 29 which in turn is integrally connected to the vertical cylindrical housing 19 will rotate the housing on the shaft 18 as illustrated in Fig. 3.

While we have here described and shown our invention as applied to lawnmowers, it will be obvious it is adaptable to other vehicles and we do not wish to be limited to the exact form shown. It will be obvious that the motor may also be mounted to directly drive the vertical shaft if desired.

It will be obvious from the foregoing that we have provided an improved powered caster wheel for propelling and guiding a lawn mower or garden implement in which the guiding of the device is accomplished by turning of the frame work structure and the powered caster wheel will rotate to guide the device which makes the device simple and easily operated.

What we claim and desire to secure by Letters Patent is:

1. A device of the character described comprising a frame, wheels for supporting the frame, a motor mounted on the frame, a bearing sleeve mounted rearwardly of said frame, brackets for mounting the bearing sleeve vertically of said frame, a vertical housing in said sleeve, a housing formed integrally with the lower end of the vertical housing, a shaft extending through the vertical housing and into the housing in the lower end thereof, a horizontal shaft in said lower housing, gear means on the lower end of the vertical shaft, means on the horizontal shaft for engaging the means on the vertical shaft rotating said last named shaft, a caster wheel mounted rearwardly of the housing on the lower end of the vertical housing, a pulley mounted on the upper end of the vertical shaft, a belt connected with the motor and said pulley for driving said vertical shaft, means carried by the horizontal shaft for driving said caster wheel, and means for disengaging the last named driving means.

2. A device of the character described comprising a frame, wheels for supporting the frame, a motor mounted on the frame, a cylindrical bearing housing rearwardly of said frame, means for mounting the housing vertically of said frame, a housing formed integrally with the lower end of the vertical housing, a shaft extending through the vertical housing and into the housing in the lower end thereof, a horizontal shaft in said lower housing, a worm gear on the lower end of the vertical shaft, a gear on the horizontal shaft meshing with the worm gear for rotating said last named shaft, bracket arms secured to said lower housing, an axle carried by the rear ends of said arms, a caster wheel on said axle, means connected with the motor and said vertical shaft for driving said vertical shaft, a pulley carried by the horizontal shaft, a pulley on said axle, a belt engaging said pulleys for driving said caster wheel, and means for disengaging said belt from driving relation with the caster wheel.

3. A device of the character described comprising a frame, wheels for supporting the frame, a motor mounted on the frame, a cylindrical bearing housing rearwardly of said frame, means for rotatably mounting the housing vertically of said frame, said cylindrical housing having an enlarged lower end, a shaft extending through said vertical housing and into the enlarged lower portion thereof, a pulley on the upper end of the vertical shaft, a horizontal shaft having driving connection with the vertical shaft, a caster wheel rigidly mounted rearwardly of said lower portion of the housing, means connected with said motor and with said pulley for rotating the shafts, means on the horizontal shaft having connection with the caster wheel for driving said caster wheel, said means including an axle upon which said caster is mounted and a pulley on said axle, a pulley on said horizontal shaft, a belt engaging said pulleys, and an idler pulley pivotally mounted on the enlarged lower end of said cylindrical housing, means for engaging and disengaging said idler pulley with said belt, and means attached to said frame for guiding said frame whereby the caster wheel will rotate independently of said frame.

MAX B. SWISHER.
GUY L. BOOTHE.

REFERENCES CITED

The following references are of record in the file of this patent:

UNITED STATES PATENTS

| Number | Name | Date |
| --- | --- | --- |
| 1,089,698 | Frederick | Mar. 10, 1914 |
| 1,153,800 | Larkins et al. | Sept. 14, 1915 |
| 1,185,630 | Carr | June 6, 1916 |
| 1,230,340 | Sweet | June 19, 1917 |
| 1,511,021 | Boring | Oct. 7, 1924 |
| 2,448,176 | Funk | Aug. 31, 1948 |
| 2,482,203 | Peterson et al. | Sept. 20, 1949 |